Nov. 2, 1937.   B. C. PLACE   2,097,641
SPRING FASTENER
Filed April 8, 1933
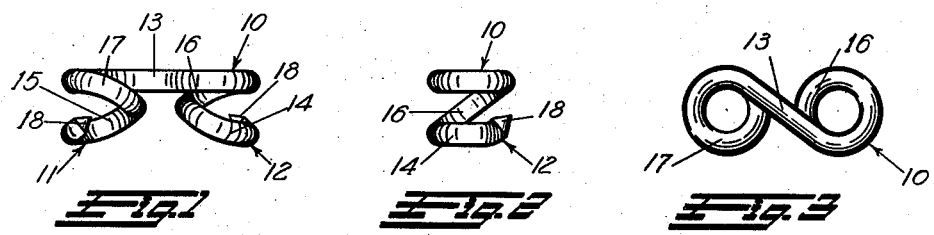
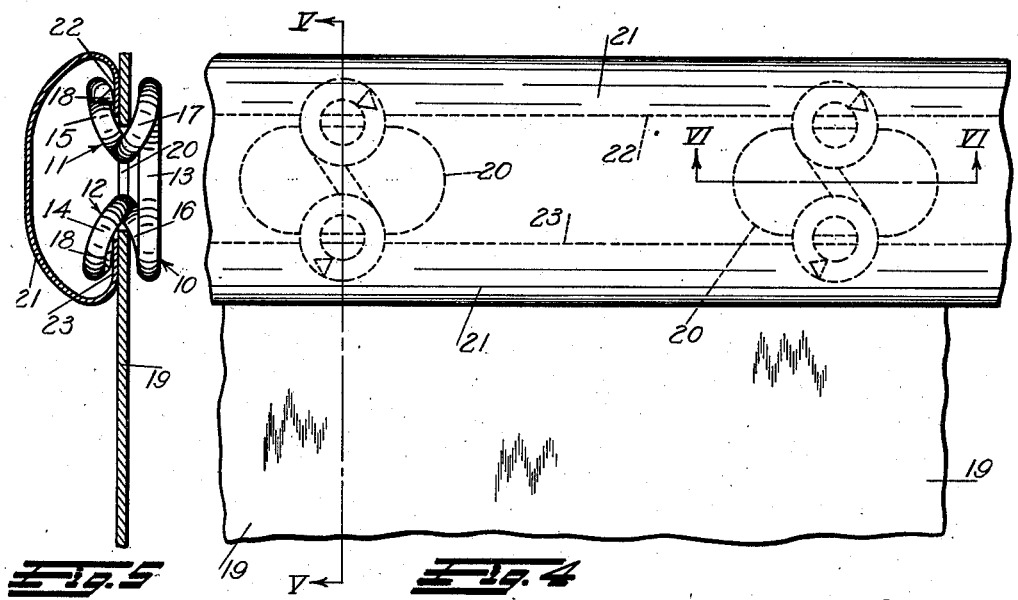
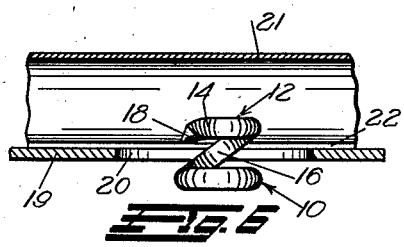
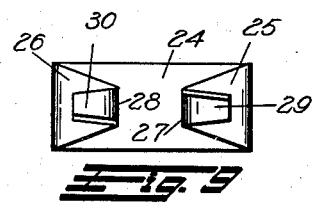
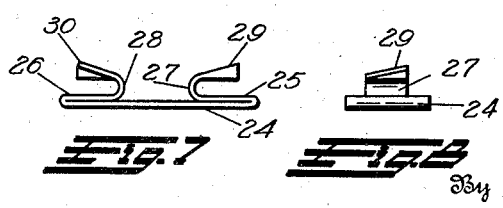
Inventor
Bion C. Place
Strauch+Hoffman
Attorneys Patented Nov. 2, 1937

2,097,641

UNITED STATES PATENT OFFICE 2,097,641

SPRING FASTENER

Bion C. Place, Detroit, Mich., assignor of one-half to George E. Gagnier, Detroit, Mich.

Application April 8, 1933, Serial No. 665,201

9 Claims. (Cl. 85—5)

This invention relates to spring fasteners intended to secure trim or like material upon a supporting structure with a continuously effective yielding pressure. More particularly, the invention relates to a headed spring fastener for holding trim material upon a supporting structure that presents no substantial projection beyond either the trim material or the supporting structure, and which fastener is brought into holding position by rotation of the fastener about an axis normal to its head.

In my Patent Number 1,679,266, I have disclosed a spring fastener that is effective to maintain trim material or the like upon a supporting structure with a continuously effective yielding pressure. The fastener of this patent, however, includes holding elements that project a substantial distance away from the head of the fastener. Such projection of the holding elements is objectionable in many situations in which there is insufficient space to the rear of the supporting structure for the reception of holding elements of substantial length, and in situations in which the holding elements are exposed to view. Under either of the latter conditions, it is highly desirable to secure the trim material in place by means of fasteners, the head and holding elements of which do not project substantially beyond the trim material or the supporting structure.

The primary object of the present invention is to provide a fastener that is effective to exert a continuously present yielding pressure tending to draw trim material or the like upon a supporting structure, the holding elements of which do not protrude materially beyond the parts of the trim material or supporting structure that are engaged thereby.

Another object of the invention is to provide a spring fastener consisting of a head and a pair of holding elements formed so that when the fastener is rotated into holding position in engagement with a supporting structure and trim material, the fastener will, during its rotation, draw the trim material firmly upon said structure.

Another object of the invention is to provide a spring fastener that may be brought into operative or holding position by a rotary motion about an axis normal to the head of the fastener.

Still another object of the invention is to provide a spring fastener constructed of a single strip of metal, the mid-portion of which is bent to form the head of the fastener, while the ends thereof are bent to provide holding elements presenting inclined holding shoulders that become effective upon rotation of the fastener about an axis normal to the head thereof.

Another object of the invention is to provide a one-piece wire spring fastener, consisting of a head in the form of the letter S and a pair of holding elements that approximate a helical form and project away from the ends of said head.

Still another object of the invention lies in the provision of a novel combination of trim material, supporting structure and fasteners, in which the trim material, supporting structure and fastener are associated in such a way that the securing of the trim material upon the supporting structure is effected by a rotation of the fastener to bring inclined shoulders into play to exert a wedging action drawing the trim material toward the supporting structure.

A still further object of the invention is to provide an improved arrangement for securing trim material, such as a hollow molding, upon a supporting structure by means of a fastener that may be rotated into engagement with inturned flanges of the molding and which will exert a yielding pull upon the molding, drawing it toward said structure.

Still further objects of the invention will appear as the description thereof proceeds with reference to the accompanying drawing in which:

Figure 1 is a side view on an enlarged scale of a spring fastener constructed from wire in accordance with the present invention.

Figure 2 is a view on the same scale taken from either end of the fastener appearing in Figure 1.

Figure 3 is a plan view of the wire fastener of Figures 1 and 2.

Figure 4 is a fragmentary view of an assembly of supporting structure and trim material showing a preferred way of using the fastener illustrated in Figures 1, 2 and 3.

Figure 5 is a sectional view taken on the plane indicated by the line V—V in Figure 4, looking in the direction of the arrows.

Figure 6 is a fragmentary sectional view taken on the plane indicated by the line VI—VI in Figure 4, looking in the direction of the arrows.

Figures 7, 8 and 9 are respectively, side, end and bottom plan views of a modified form of fastener, corresponding to the present invention, constructed of sheet metal.

Like reference characters indicate like parts throughout the several views.

The preferred form of spring fastener constituting an essential part of the present invention is preferably constructed of a single piece of wire by bending the mid-portion thereof to form the head of the fastener and by bending the ends away from the head in such shape that said ends will provide holding elements. Said preferred form is illustrated in Figures 1, 2 and 3, in which 10 designates the head of the fastener, and 11 and 12 the holding elements thereof. The head 10 of the fastener is preferably constructed by bending the mid-portion of the wire into the form of a letter S as designated by 13. The ends of the wire are then gradually bent out of the plane of the head on a helical, or approximately helical path to the extent of approximately one convolution, forming holding portions 14 and 15 and connecting portions 16 and 17 that serve to connect said holding portions to the ends of the S-like head. The holding portions 14 and 15 it will be noted may be said to be disposed in acute angular relationship to a plane parallel to the head and inclined from one lateral edge to the other lateral edge. The extreme tips of the wire are preferably turned upwardly toward the head of the fastener as indicated by 18. The fastener is constructed of properly tempered, relatively stiff, spring materials. The pitch of the helix is so selected that the connecting portions 16 and 17 of the holding elements of the fastener will serve to space the holding portions 14 and 15 from the head 13 of the fastener a distance approximately equal to the combined thicknesses of the supporting structure and the trim material that are to be secured together by means of the fastener.

The fastener just described may be used to secure trim material of any character to a plate-like supporting structure. I have illustrated one way of using the fastener in Figures 4 and 5, in which 19 designates a plate-like supporting structure provided with elongated openings 20 of a size sufficient to permit the passage of the holding elements of the fastener therethrough. In the illustrated application of the fastener, trim material in the form of a hollow molding of metallic structure, consisting of a body 21 and inturned flanges 22 and 23 spaced from said body, is shown secured upon structure 19. The edges of the inturned flanges are separated from each other providing an elongated opening in the trim material.

The molding is juxtaposed upon the supporting structure 19 with the opening formed between the edges of the inturned flanges opposite the openings 20 in the supporting structure. With the parts in this position, fasteners, such as illustrated in Figures 1, 2 and 3, are successively applied to the openings 20 by passing the holding elements therethrough and through the opening in the trim material provided between the edges of the inturned flanges thereof. By means of a suitable tool the fasteners are then rotated about an axis normal to the planes of the heads of the fasteners, bringing the holding portions 14 and 15 into engagement respectively with the flanges 22 and 23, as illustrated particularly in Figure 5 of the drawing. Inasmuch as said holding elements are inclined at a slight, acute angle with respect to a plane parallel to the head of the fasteners by virtue of the fact that they are bent approximately on a helix, it will be apparent that when the fastener is rotated the engagement of said inclined surfaces on said portions serves to exert a wedging action drawing the molding or trim material firmly into contact with the supporting structure. The yielding holding pressure thus exerted increases as the fastener is rotated to the final position at which the head of the fastener extends transversely across the opening 20 in the supporting structure. Since, in the application of the fastener, the holding elements are somewhat distorted from their normal substantially helical form, it will be understood that considerable pressure is exerted by said holding elements upon the trim material and said pressure is effective to prevent the ready release of the fastener, because of the friction thus set up between the holding portions and the trim material and the supporting structure. In order to increase the resistance of the fastener to reverse rotation or to rotation opposite to that by which it was applied, the inturned tongues or teeth 18 may be provided which engage the trim material and resist rotation of the fastener.

Preferably, but not necessarily, the width of the elongated slot 20 in the supporting structure is made to correspond precisely to the distance between the connecting portions 16 and 17 measured to their exterior surfaces, so that, when the fastener is in applied position, said connecting portions bear firmly against the edges of said openings, thus adding to the friction preventing the ready reverse rotation of the fastener and inadvertent disassembly of the trim material from the supporting structure. At the same time, the engagement of said connecting portions and the edges of the openings 20 serves to positively prevent bodily shifting of the fastener with respect to the supporting structure in a direction transverse to the length of the elongated openings therein.

It will be observed that since neither the heads nor the holding elements of the fastener protrude materially beyond the surfaces with which they contact, the fastener just described is particularly designed for use in situations in which there is only a limited amount of space for the reception of the holding element, and in situations in which, due to the fact that the fasteners are exposed, it is undesirable to have any part thereof project substantially beyond either the trim material or the supporting structure. Of course, the fastener can be used to hold trim material provided with perforations similar to the perforations 20 upon a suitable supporting structure by passing the fastener first through the trim material, rather than in the first instance through the supporting structure, as illustrated in the drawing, as will be readily understood by those skilled in the art.

If desired, the fastener may be constructed of sheet metal rather than of wire. Such a fastener is illustrated in Figures 7, 8 and 9 of the drawing and preferably consists of a head 24 formed from the mid-portion of a band of sheet metal. The metal band is return-bent to form portions 25 and 26 that preferably lie in contact with the underside of the head 24. The end portions of the strip of metal beyond portions 25 and 26 are bent away from the head 24 providing connecting portions 27 and 28 that carry the holding portions 29 and 30.

The holding portions 29 and 30 and the connecting portions 27 and 28 constitute the holding elements of this fastener. The holding portions 29 and 30 are inclined at a slight acute angle with respect to a plane parallel to the head of the fastener so that when the fastener just described is employed in the manner of the preferred form of fastener illustrated in Figures 1, 2 and 3, the rotation thereof will cause said inturned surfaces to wedge the trim material towards the supporting structure and thus will be effective, in view of the fact that they are constructed of spring material, to exert a continuously effective yielding pressure drawing the trim material toward the supporting structure, and at the same time increasing the friction between the holding portions of the fastener and the trim material, which is effective to prevent the fastener from becoming accidentally dislodged from its holding position.

Of course, the fasteners of both forms of the invention may be removed when it is desired to remove or replace the trim material by using a suitable tool to reversely rotate them to release the holding portion from engagement with the trim material and to remove the fastener through the perforations in the supporting structure.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A one-piece wire spring fastener consisting of a flat head and a pair of laterally separated holding elements projecting away from said head, each of said elements approximating a helical form.

2. A one-piece wire spring fastener consisting of a flat head formed from the mid-portion of the wire and a pair of laterally spaced holding elements projecting away from said head and formed from the ends of said wire, said holding elements being approximately helical in form.

3. The fastener defined in claim 2 in which the tips of the ends of the wire are bent toward said head to provide tongues to engage a member disposed between said head and holding elements.

4. A one-piece wire spring fastener comprising a head in the form of a letter S and a pair of laterally separated holding elements projecting away from the plane of said head at the ends of said S, each of said holding elements presenting a holding surface that is disposed at a small acute angle to a plane parallel to said head and inclined from one lateral edge to the other lateral edge.

5. A spring fastener of sheet metal form comprising a head formed from the mid-portion of a strip of metal and two holding elements of U-shape formed from the ends of said strip and opening in opposite directions, the portions of each of said U-shaped, holding elements remote from said head being inclined from one lateral edge toward the other at a small acute angle with respect to a plane parallel to said head.

6. A spring fastener complete in itself and designed to be turned into position to hold two superposed members having registering openings in yielding contact, comprising a head formed by bending the mid-portion of a resilient piece of stiff wire into the form of the letter S providing spaced loops designed to respectively lap one of said members at opposite sides of the opening therein, and a pair of separated holding elements formed by bending the ends of said piece of wire into helical form so as to engage the other of said members upon rotation of the fastener at opposite sides of the opening therein in a manner to draw said members in firm engagement with each other.

7. A spring fastener complete in itself and of the turn-engagement type for securing superposed members consisting of a flat head formed from the mid-portion of a strip of spring metal and a pair of holding elements projecting away from said head and formed from the ends of said strip, each of said holding elements including a resilient portion providing shoulders approximately parallel to the plane of the head, each of said portions being slightly inclined with respect to said plane from one lateral edge of each portion toward the opposite lateral edge whereby upon rotation of said fastener relative to said members with said members between said head and shoulders the members will be progressively wedged into firm contact with each other.

8. A spring fastener complete in itself and of the type designed to be turned into position to hold two superposed members having registering openings in yielding contact, comprising a flat head formed from the mid-portion of a resilient strip of metal in a form to bridge said openings and lap one of said members at opposite sides of the opening therein, and a pair of separate holding elements formed from the ends of said strip of metal, said elements being disposed at a slight angle to the head and each inclined from one lateral edge toward the other to progressively draw said members into contact as said fastener is turned toward its holding position and having a width sufficient so that said elements engage the other of said members at opposite sides of said openings.

9. A spring fastener complete in itself and of the type designed to be turned into position to hold two superposed members having registering openings in yielding contact, comprising a head formed from a portion of a resilient piece of metal in a form to bridge said openings and lap one of said members at opposite sides of the opening therein, and holding elements formed from the remainder of said piece of metal, said elements being inclined toward their lateral edges to progressively force said members into firm contact upon turning of the fastener and having a width sufficient so that said elements engage the other of said members at opposite sides of said openings.

BION C. PLACE.